United States Patent [19]

Jespersen

[11] Patent Number: 4,929,820
[45] Date of Patent: May 29, 1990

[54] PROCEDURE AND LABEL FOR BAR CODE MARKING ON VULCANIZABLE OR VULCANIZED RUBBER PRODUCTS

[75] Inventor: Frank Jespersen, Lystrup, Denmark

[73] Assignee: Milliken Denmark A/S, Morke, Denmark

[21] Appl. No.: 257,460

[22] Filed: Oct. 13, 1988

[30] Foreign Application Priority Data

Aug. 1, 1988 [DK] Denmark .............................. 4280/88

[51] Int. Cl.⁵ ............................................ G06K 19/00
[52] U.S. Cl. .................................... 235/487; 235/448; 235/468
[58] Field of Search ......................... 235/448, 468, 487

[56] References Cited

U.S. PATENT DOCUMENTS

| | | |
|---|---|---|
| 2,169,146 | 8/1939 | Iverson . |
| 2,663,902 | 12/1953 | Anderson . |
| 3,183,551 | 5/1965 | Johnson . |
| 3,311,951 | 4/1967 | Borchard et al. . |
| 3,671,159 | 6/1972 | Greenberg et al. . |
| 3,781,798 | 12/1973 | Hinks .................................. 235/448 |
| 3,810,159 | 5/1974 | Hinks .................................. 235/468 |
| 3,825,378 | 7/1974 | Dart et al. . |
| 3,872,786 | 3/1975 | Holton . |
| 4,447,201 | 5/1984 | Knudsen . |

*Primary Examiner*—Harold I. Pitts
*Attorney, Agent, or Firm*—Earle R. Marden; H. William Petry

[57] ABSTRACT

In that a method for bar code marking on vulcanizable or vulcanized rubber products, where the bar code of each marking varies from the preceding one, a bar code pattern (4) is given to the rubber product (2) through a source of electromagnetic radiation which is controlled by a computer electronic word processing system to form the bar code pattern (4) required on the rubber product (2) surface, i.e., the first side (12) and focusing on this, and that the source of radiation wavelengths and energy are adapted to the kind of marking and marking (4) depth required in the rubber product (2), higher bar code wearability is achieved.

6 Claims, 1 Drawing Sheet

PROCEDURE AND LABEL FOR BAR CODE MARKING ON VULCANIZABLE OR VULCANIZED RUBBER PRODUCTS

BACKGROUND OF THE INVENTION

The present invention concerns a method for bar code marking on vulcanizable or vulcanized rubber products where the bar code of each marking varies from the preceding one.

Methods are known for bar code marking on paper and plastic when printing with printing ink, and any such bar code marking can only be used on vulcanizable or vulcanized rubber products whenever there are no requirements for the bar code marking wearability.

SUMMARY OF THE INVENTION

It is the purpose of this invention to provide a hard-wearing bar code marking on rubber products, especially such as are exposed to wear in use, such as rubber mats, rubber footwear, rubber balls, rubber sheet or plates and moulds. This is achieved through a method to the invention, characterized in that a bar code pattern is applied to the rubber product through a source of electromagnetic radiation, controlled by a computer or electronic word processing system to form the bar code pattern required on and below the rubber product surface, i.e., first side, and focusing on same, and that the radiation source wavelengths and energy are adapted to the kind of marking and marking depth required in the rubber product. Due to the energy supply, bar code marking with far bigger depths or thicknesses than possible with normal printing processes may be had, and thus the marked products will get a far better wearability for the bar code.

In a preferable embodiment of the method, the electromagnetic radiation is emitted for marking of a rubber product consisting of a rubber sheet or plate in which white pigment has been mixed, in which connection the radiation wave length is in the red-infrared range, and the marking depth goes wholly or partly through the rubber between the first second side of the product by adapting the radiation energy value accordingly. This wavezone is particularly rich in energy and highly suitable for generation of physical changes in the rubber product.

In another preferable embodiment of the method, said radiation is emitted appropriately for marking of a product consisting of a rubber in which a substance has been mixed which is sensitive to at least one wavelength range of electromagnetic radiation so that the substance when exposed to said wavelength range electromagnetic radiation of a certain energy level will permanently, irreversibly change its state, such as colour, specific gravity, light reflection capacity, porosity or phase, for instance from solid to liquid or to gaseous state locally in the particular radiation bar code pattern. Said changes in state are all of such a nature that the bar code may be observed visually, a fact obvious in relation to changes in colour or in light reflection. Changes in specific gravity, too, may be observed visually as these will cause either an elevation of the material or an indentation of the material where the specific gravity has changed. The porosity will also constitute a visual surface change if the bar code area has more or less porosity than the surrounding surface. If the change of state is from solid into gaseous state the material will simply vanish, leaving in the area radiated indentations representing the bar code pattern.

In a further embodiment of the method, the other side of the rubber product thus given a bar code pattern is provided with a vulcanizable rubber layer which is vulcanizable both with the rubber product and with a rubber article of a specific rubber composition, and the rubber product is appropriately placed with its other side given a rubber layer bearing against the rubber article rubber composition after which the rubber article required to be marked and consisting of said rubber composition after which the rubber product and the rubber article are co-vulcanized for instance in a vulcanizing press so that the first side of the product will be flush with the article surface whereas the other side of the product is immersed in the article material.

A label to be used for the method is characterized in that it consists of a plate, sheet or foil-shaped rubber material in the first side of which a bar code pattern has been formed throughgoing to the other side wholly or partly in the form of a local physical change in the material.

BRIEF DESCRIPTION OF THE DRAWINGS

Below, the invention will be further explained in relation to some embodiments, and with reference of the drawing where FIG. 7 shows a rubber article in the top or bottomside of which a bar code marked rubber product has been vulcanized in, and FIG. 8 shows a section along II—II in FIG. 7 through the rubber product vulcanized in.

DESCRIPTION OF THE PREFERRED EMBODIMENT

Figure 1:
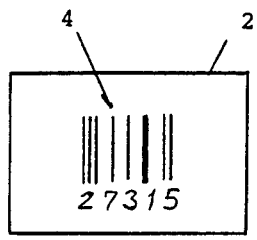
FIG. 1 shows a rubber product with bar code pattern of the invention.
Figure 2:
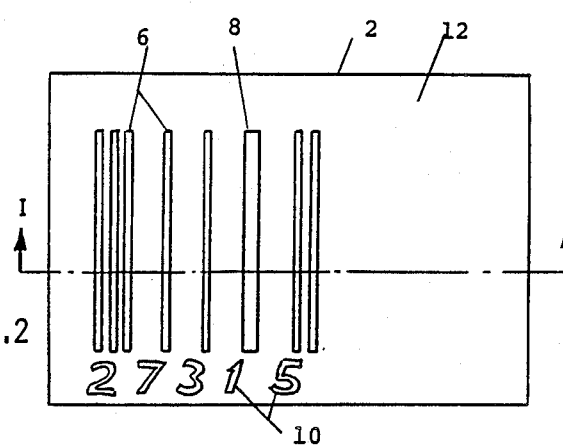
FIG. 2 shows what is shown in FIG. 1 on a larger scale.

FIG. 1 shows a rubber product 2 in the form of a rubber plate, sheet panel or a rubber foil in which a bar code pattern 4 has been produced through the method to the invention. This has been shown in FIG. 2 in a larger scale. Narrow bars 6 and wide bars 8 in the bar code have, as shown, been placed at certain intervals in a specific order for the bar code shown, and the No. 10 corresponding to the bar code has been made in the rubber product 2 in the same manner as the actual bar code pattern 4. The rubber product 2 is preferably a vulcanized rubber product before the bar code pattern is made in it but the bar code pattern may also be made in vulcanizable rubber products through the method to the invention.

As known with bar coding, each marking bar code is different from the preceding one.

Through the method to this invention, a bar code pattern is made in the rubber product 2 using a source of electromagnetic radiation not shown; the radiation of this radiation source is controlled by a computer or electronic word processing system for the formation of the bar code pattern 4 required on the rubber product 2 surface, i.e., the first side 12 and focusing on this. The radiation source wavelengths, and energy are adapted to the kind of marking and marking depth required to be made in the rubber product 2. The nature of the marking is determined by the kind of permanent physical change in the rubber product material locally in the bar code pattern required to be made. The physical change may be a change in colour, for instance from white to black at a certain depth or burning away of the rubber material, i.e., conversion of same from solid to gaseous state so as to form throughgoing openings in the rubber product 2 or partly throughgoing openings the bottom of which is coloured in a colour contrasting with the general colour of the rubber product 2. The physical change may also be a change in specific gravity, a light reflection change, porosity change or a change from solid to adhesive phase at a certain depth of the rubber product 2 material, possibly all the way through from the first side 12 of the rubber material to its other side 14 such as would appear from FIGS. 5 and 6.

Figure 3:
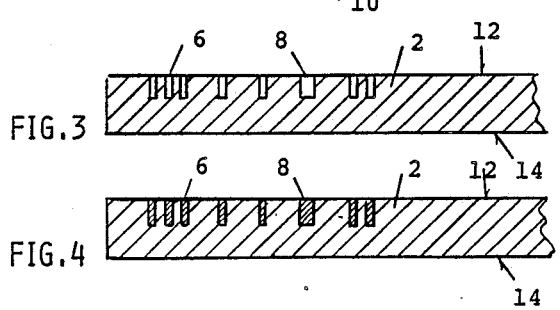
FIG. 3 shows a section along I—I in FIG. 2 where the bar code pattern is formed by indentations.
Figure 5:
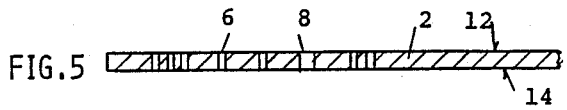
FIG. 5 shows a section along I—I with throughgoing bar code pattern in the form of throughgoing openings.

FIG. 3 and FIG. 5 represent examples where the bar code marking 4 in the rubber product 2 is constituted by wholly or partly throughgoing openings 6, 8, i.e., where the material has been removed in the bar code pattern in gaseous state.

Figure 4:
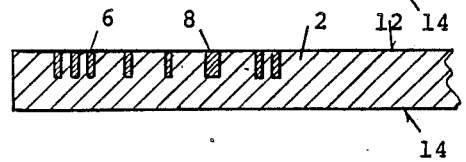
FIG. 4 shows a section along I—I in FIG. 2 where the bar code pattern is constituted by local edb material state changes.
Figure 6:
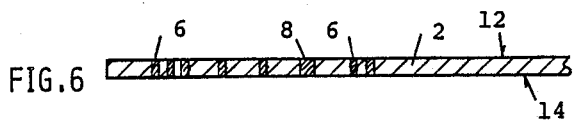
FIG. 6 shows a section along I—I in FIG. 2 where the bar code pattern is constituted by throughgoing material state change areas.

In FIGS. 4 and 6, the rubber product 2 material in the bar code pattern has, however, not been removed but merely converted into another physical state than the surrounding material.

In a preferable embodiment of the rubber product 2, a white pigment has been mixed into it so that the product assumes a white appearance. The bar code pattern has been made in the product 2 surface, for example through a radiation the wavelength of which is in the red-infrared range which is particularly suitable for conversion of the rubber product 2 material into gaseous state, or merely for a local colour change at a certain depth, possibly throughgoing.

The rubber product 2 material may in a preferable embodiment have a substance mixed in which is sensitive to at least one wavelength range of electromagnetic radiation so that the substance will, when exposed to said wavelength range electromagnetic radiation of a certain minimum energy level, change state permanently and irreversibly. This change of state may be a change in colour, a specific gravity change, a light reflection capacity change, a porosity change or a local phase change, for instance from solid to liquid, to adhesive or gaseous state locally in the area of the particular bar code pattern.

Wherever it is particularly a matter of chemical material changes unlike physical material changes, electromagnetic radiation in the violetultraviolet wave range may come into the picture, too. Any such substances for mixing into material of rubber products 2 are referred to as sensitivityconveying substances, and depending on the kind of sensitivity in question, further information is provided on this, for instance thermosensitivity substances if the substances are sensitive to heat transmission or UV sensitivity-conveying substances, i.e., substances rendering the particular material particularly sensitive to ultra-violet radiation.

The other side 14 of the rubber product 2 given a bar code pattern may in a preferable embodiment by given a vulcanizable rubber layer which is co-vulcanizable both with the rubber product 2 and with a rubber article 16 of a particular rubber composition. The product thus given a vulcanizable rubber layer is placed with said other side 14 bearing against the rubber article 16 required to be marked and consisting of said specific rubber composition after which the rubber product 2 and the rubber article 16 are co-vulcanized for instance in a vulcanizing press not shown so that the first side 12 of the product 2 is flush with the article 16 surface whereas the other side 14 of the product 2 is immersed in the article materials. Thus, big rubber articles which are hard to give a bar code marking to the invention may still be bar code marked through said co-vulcanizing.

Figure 7:
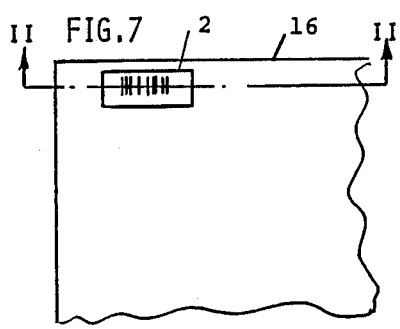
Figure 8:
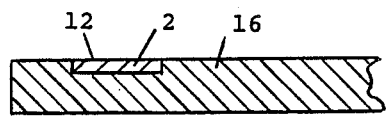

FIGS. 7 and 8 show such a product 2 embedded in the article 16. The product 2 in FIGS. 7 and 8 thus constitutes a label, consisting of a panel or foil shaped rubber material in the first side 12 of which a bar code pattern 4 throughgoing wholly or partly to the other side 14 has been formed.

This label may be immediately co-vulcanizable with a vulcanizable rubber article 16 or may have a layer of vulcanizable rubber applied to its other side 14 and narrow edges, compatible both with the label material and the material for the rubber article with which the label is to be covulcanized.

An example of a substance to be mixed into the material for the rubber product 2 or the label, sensitive to at least one wavelength range of electromagnetic radiation is that of tellurium compounds the physical state of which may be changed through electromagnetic radiation. Any such change may be permanent irreversible or permanent reversible since it may be reversed to its original state through radiation using electromagnetic radiation of another wavelength range. Also silicon compounds with similar characteristics may be considered as radiation sensitive mixing substance(S).

An example of an electromagnetic radiation which will be highly suitable for the application of the invention is that of laser radiation.

The term rubber is not limited only to concern natural rubber, also synthetic rubbers are comprised by the term, such as nitrile latex, nitrile rubber, styrene butadiene rubber, carboxylated rubber, etc.

I claim:

1. Method of bar coding a vulcanizable or vulcanized rubber product with a plurality of different bar code markings comprising the steps of: providing a source of electromagnetic radiation, applying varying wave lengths and levels of radiation from the electromagnetic radiation source onto the surface of the rubber product to form a bar code pattern thereon and controlling the radiation from the electromagnetic radiation source by an electronic control system to cause the electromagnetic source to provide radiation in the wave lengths and levels of energy to form the predetermined bar code pattern on the rubber product.

2. The method of claim 1 wherein the side of said rubber product opposite to the side of the bar code pattern is given a layer of vulcanizable rubber and is vulcanized to a rubber article.

3. The method of claim 1 wherein the rubber product prior to the application of the desired radiation has a white pigment mixed therein which has a radiation length in the red-infrared range.

4. The method of claim 3 wherein the side of said rubber product opposite to the side of the bar code pattern is given a layer of vulcanizable rubber and is vulcanized to a rubber article.

5. The method of claim 1 wherein the rubber product to be bar coded prior to being radiated is mixed with a substance which is sensitive to at least one wave length of the electromagnetic radiation so that the mixed substance will chance state permanently and irreversibly when exposed to the desired wave length range or radiation.

6. The method of claim 5 wherein the side of said rubber product opposite to the side of the bar code pattern is given a layer of vulcanizable rubber and is vulcanized to a rubber article.

* * * * *